US007986430B2

(12) United States Patent
Machida et al.

(10) Patent No.: US 7,986,430 B2
(45) Date of Patent: Jul. 26, 2011

(54) DISPLAYING DEVICE AND IMAGE FORMING APPARATUS

(75) Inventors: Masahiro Machida, Kanagawa (JP); Hidekazu Ozawa, Kanagawa (JP); Takao Maekawa, Kanagawa (JP); Tetsuya Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/754,246

(22) Filed: Apr. 5, 2010

(65) Prior Publication Data

US 2010/0188701 A1 Jul. 29, 2010

Related U.S. Application Data

(62) Division of application No. 10/681,382, filed on Oct. 9, 2003, now Pat. No. 7,719,698.

(30) Foreign Application Priority Data

Jan. 27, 2003 (JP) ................................ 2003-017632

(51) Int. Cl.
*G06F 15/00* (2006.01)
*G01F 23/00* (2006.01)

(52) U.S. Cl. ........................................ 358/1.15; 73/290

(58) Field of Classification Search .................... 73/290; 358/1.15, 1.13, 1.14, 1.12, 296; 370/352, 370/353, 493, 442, 458; 600/300, 309, 347, 600/365; 345/172, 660
See application file for complete search history.

(56) References Cited

U.S. PATENT DOCUMENTS

| | | | | |
|---|---|---|---|---|
| 5,070,324 | A * | 12/1991 | Furushima | 345/172 |
| 5,172,244 | A | 12/1992 | Nakahara et al. | |
| 5,206,689 | A | 4/1993 | Kusuda | |
| 6,215,467 | B1 | 4/2001 | Suga et al. | |
| 2001/0035973 | A1 | 11/2001 | Kusumoto | |
| 2002/0167680 | A1 | 11/2002 | Sakurai | |

FOREIGN PATENT DOCUMENTS

| | | |
|---|---|---|
| JP | 61-148462 | 7/1986 |
| JP | 06-149436 | 5/1994 |
| JP | 2577400 B | 11/1996 |
| JP | 2000-047532 | 2/2000 |

* cited by examiner

*Primary Examiner* — Saeid Ebrahimi Dehkordy
(74) *Attorney, Agent, or Firm* — Morgan, Lewis & Bockius LLP

(57) ABSTRACT

Such a displaying device that can be easily operated by aged persons and handicapped persons, and an image forming apparatus using the same will be provided. Upon continuously operating an upper button for the predetermined period of time, a set value of a magnification is changed at intervals of numeric change that are different from each other between a voice guide mode activated by a voice guide button and a normal mode. At this time, it is configured in such a manner that the interval of numeric change for the normal mode is smaller than the interval of numeric change for the voice guide mode, i.e., the changing rate of the set value of the magnification for the normal mode is larger than that for the voice guide mode.

8 Claims, 12 Drawing Sheets

DISPLAYING DEVICE AND IMAGE FORMING APPARATUS

This application is a Divisional of U.S. patent application Ser. No. 10/681,382, filed Oct. 9, 2003, now U.S. Pat. No. 7,719,698 and claims priority to Japanese Patent Application No. 2003-017632, filed in Japan on Jan. 27, 2003, both of which are hereby incorporated by reference in their entirety.

BACKGROUND OF THE INVENTION

1. Field of the Invention

The present invention relates to a displaying device and an image forming apparatus, and in particular, it relates to a displaying device that can be applied to an image forming apparatus, such as a duplicator, a printer and a facsimile, and an image forming apparatus.

2. Description of the Related Art

In recent years, it has been called for urgent attention, associated with the forthcoming aging society, to enhance office environments as social infrastructure where aged persons and handicapped persons can work equivalently to the robust.

In a displaying device of an image forming apparatus, such as a duplicator, a printer and a facsimile, on the other hand, such a constitution is employed for reducing the operation time and for improving the operationality upon configuring the magnification in that the unit value upon changing the displayed magnification is changed corresponding to the time for operating the configuring key.

For example, as proposed in the technique described in JP-A-61-148462, in a magnification configuring method of a duplicator where the duplication magnification is continuously changed during the period, on which the magnification configuring key is being pressed, the period of time, on which the magnification configuring key is being pressed is detected, and associated with the increase of the period of time, the changing amount of the duplication magnification per unit time is increased. Accordingly, the changing amount of the duplication magnification per unit time is increased corresponding to the period of time, on which the magnification configuring key is being pressed, whereby the time required for obtaining the desired magnification can be reduced to improve convenience on operation.

Furthermore, as proposed in the technique described in Japanese Patent No. 2,577,400, in a numeric value configuring method for configuring a numeric value, such as a magnification of a duplicator, while the numeric value is displayed with a displaying unit, the change of the displayed numeric value started upon pressing a numeric value change instructing unit is continuous change by the minimum changing unit during the period starting from pressing the numeric value change instructing unit for a prescribed time, and thereafter, it is totally or partially discontinuous change by plurality of the minimum changing units, whereby the changing rate of the displayed numeric value on the continuous change is the same as that on the discontinuous change, or in alternative, that on the continuous change is larger than that on the discontinuous change. According to the manner of configuring a numeric value, the time required for obtaining the desired magnification can be reduced to improve convenience on operation as similar to the aforementioned technique.

However, there are increasing tendencies that the operation of the image forming apparatus is complicated, and thus, the operation of the apparatus involves difficulties.

In particular, an up and down button frequently used on an operation panel of the current image forming apparatus described in the foregoing has such a specification that is difficult to be used by aged persons and handicapped persons, in which the increment unit time of data after continuous press of the button is shortened.

SUMMARY OF THE INVENTION

The invention has been made in view of the aforementioned circumstances and is to provide such displaying device and image forming apparatus that can be easily operated by aged persons and handicapped persons.

In an aspect of the invention, a displaying device contains: an increasing and decreasing unit for instructing increment or decrement of a numeric value representing a prescribed configured value; a numeric value displaying unit for displaying the numeric value thus increased or decreased by the instruction made by the increasing and decreasing unit; a numeric value display changing unit for continuously changing the numeric value displayed on the numeric value displaying unit during a period where the instruction is continuously made by the increasing and decreasing unit; and a changing unit for changing a rate of continuous change of the numeric value by the numeric value display changing unit.

According to the aforementioned aspect of the invention, the increasing and decreasing unit makes an instruction for a numeric value representing a prescribed configured value, such as configuration of a magnification and configuration of a number of images to be formed in an image forming apparatus. The numeric value displaying unit displays the numeric value representing a prescribed configured value thus increased or decreased by the instruction made by the increasing and decreasing unit.

The numeric value display changing unit continuously changes the numeric value representing a prescribed configured value displayed on the numeric value displaying unit during the period where the instruction is continuously made by the increasing and decreasing unit.

The changing unit changes the rate of continuous change of the numeric value representing a prescribed configured value by the numeric value display changing unit. That is, the rate of continuous change of the numeric value representing a prescribed configured value is changed by the changing unit corresponding to operators, whereby aged persons and handicapped persons can easily operate the device.

BRIEF DESCRIPTION OF THE DRAWINGS

Preferred embodiments of the present invention will be described in detail based on the following figures, wherein.

DESCRIPTION OF PREFERRED EMBODIMENTS

An embodiment of the invention will be described below with reference to the drawings. In the embodiment, the invention is applied to a multifunction machine having a multiple functions, such as a scanner function, a duplicator function, a facsimile function and a printer function.

Figure 1:
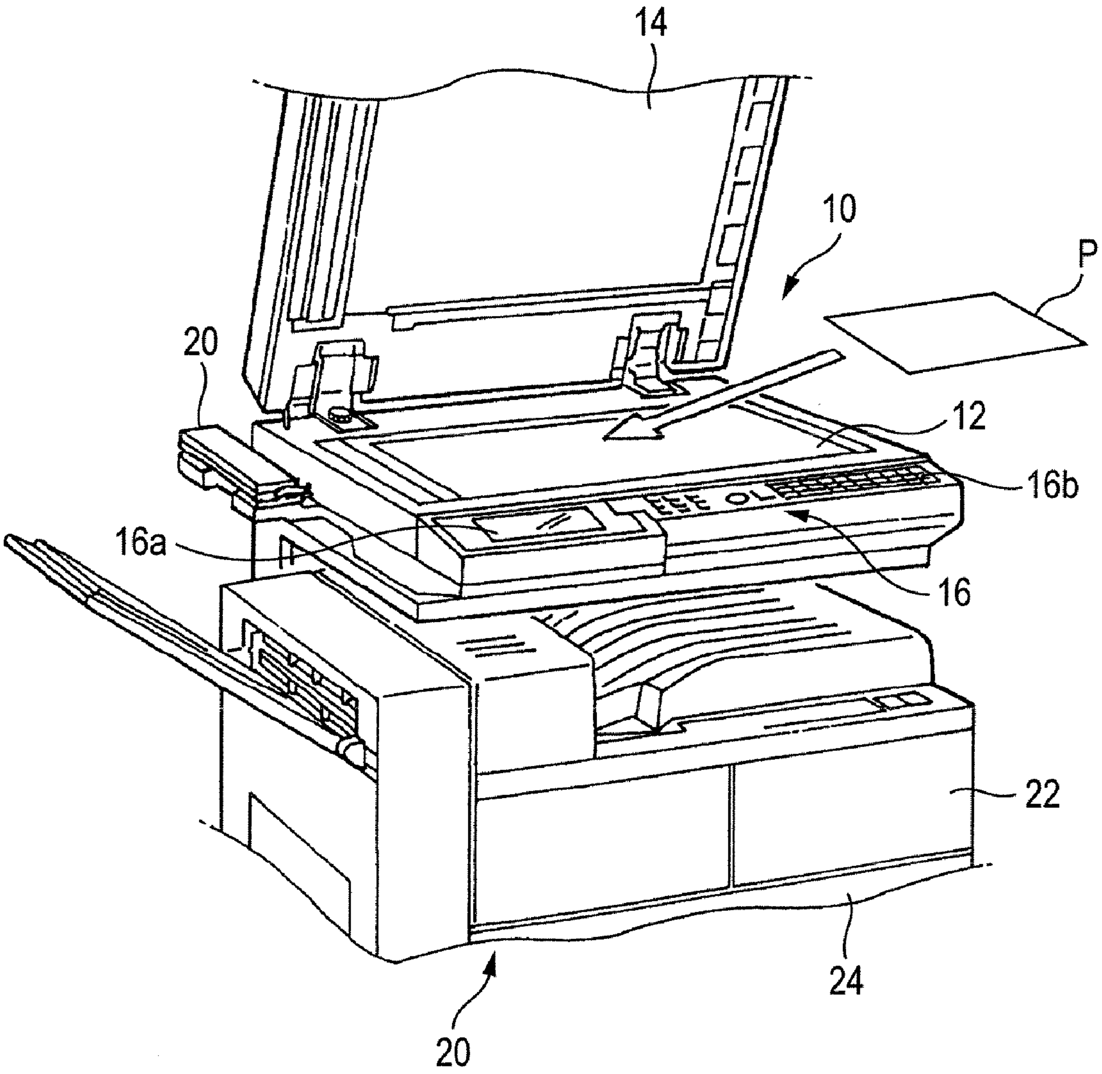
FIG. 1 is a perspective view showing an appearance of a multifunction machine relating to an embodiment of the invention.

As shown in FIG. 1, an image input part 10 of a multifunction machine according to an embodiment of the invention has a platen glass 12, a cover 14, a control panel 16 and a handset 20. The platen glass 12 is to carry an original copy P for duplication or facsimile. The original copy P carried on the platen glass 12 is read by an image reading device, which is not shown in the figure, and image data of the original copy P thus read is temporarily stored in a memory and subsequently converted to an image signal for facsimile communication or printer output.

The control panel 16 has a liquid crystal display 16*a* having a touch-sensitive panel 16*c* (see FIG. 3) on the surface thereof, and an operation part 16*b*. The liquid crystal display 16*a* is used for displaying an operation guide and for displaying various kinds of configuration data upon using the multifunction machine as a duplicator, a facsimile or a printer, and various kinds of configurations can be input by utilizing the touch-sensitive panel 16*c*. The operation part 16*b* has various operation buttons, such as a numeric keypad for inputting a number of duplication and facsimile phone numbers, one-touch operation buttons, in which facsimile numbers are registered, and a start button for starting duplication or facsimile communication.

The handset 20 is used on an operation for manual reception of a facsimile. In the image output part 10, an upper part 22 thereof has incorporated therein a printer engine for printing image data thus read on the image input part 10, facsimile data sent from another facsimile machine, or character data or image data sent from a personal computer, and a lower part 24 thereof contains paper trays housing paper of various sizes.

Figure 2:
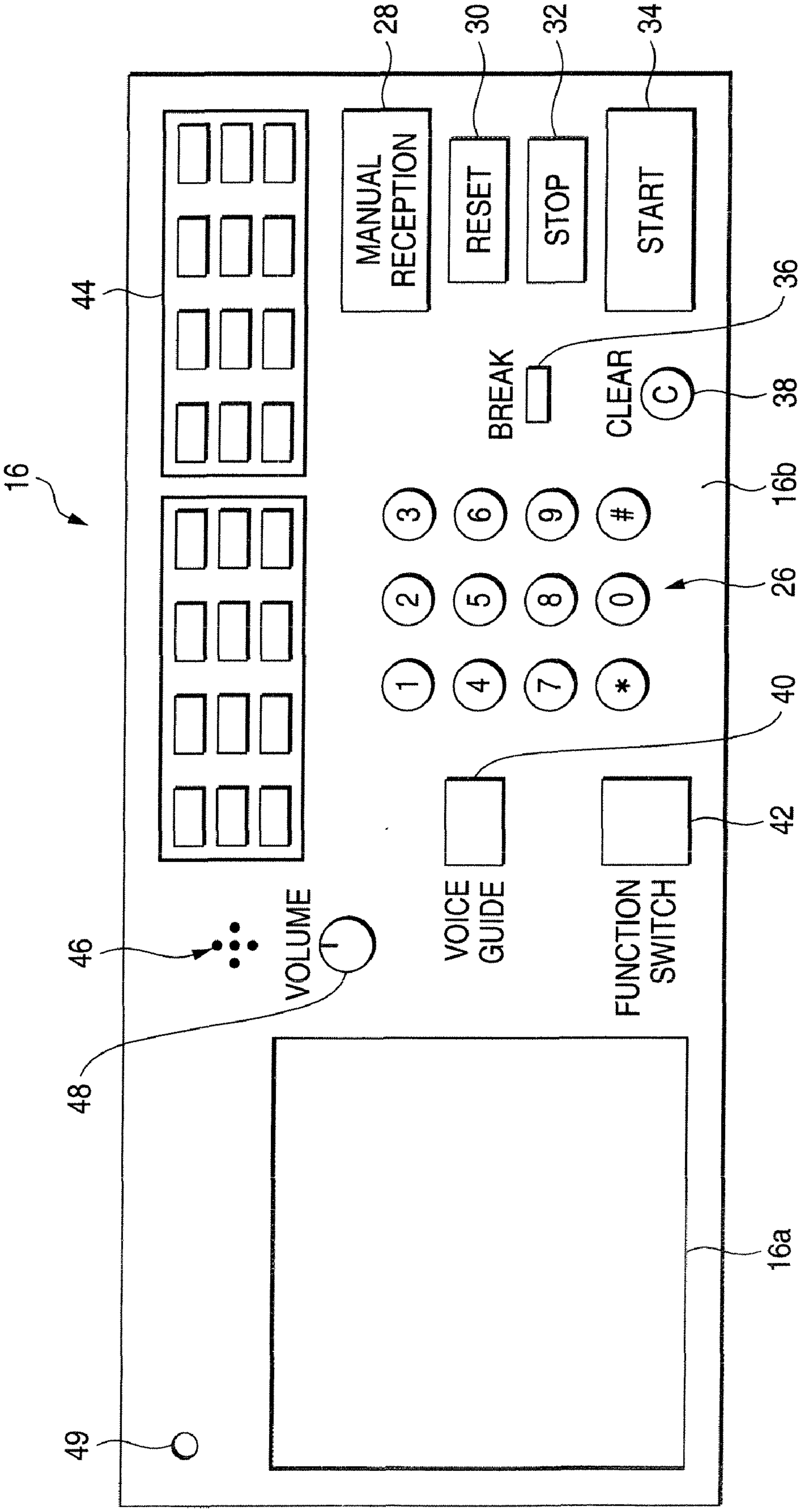
FIG. 2 is a diagram showing a specific constitutional example of a control panel.

FIG. 2 is a diagram showing a specific example of the constitution of the control panel 16. In the control panel 16, the liquid crystal display 16*a* is arranged on the left side, and the operation part 16*b* is arranged on the right side. In the operation part 16*b*, a numeric keypad 26, a manual reception button 28, a reset button 30, a stop button 32, a start button 34, a break button 36, a clear button 38, a voice guide button 40, a function switch button 42 and one-touch operation buttons 44 are provided. A voice output part 46, a volume knob 48 and an earphone jack 49 are also provided in the operation part 16*b*.

The numeric keypad 26 is used for configuring the number of sheets of copies or the number of copies, and inputting a telephone number for facsimile, and registering telephone numbers to the one-touch operation buttons 44. The manual reception button 28 is used for switching the automatic reception mode of facsimile to the manual reception mode. The reset button 30 is used for canceling the inputted value in the case where the value is wrong. The stop button 32 is used for stopping the operation having been started.

The start button 34 is used for starting the operation, such as duplication, facsimile or printer, after completing configuration. The break button 36 is used for interrupting the operation. The clear button 38 is used for clearing the configuration set through the control panel 16 to retrieve the initial configuration.

The voice guide button 40 is used for carrying out all the operations in a voice guide mode. The voice in the voice guide mode is output from the voice output part 46 and can be listened with an earphone by inserting it into the earphone jack 49. The volume of the voice can be adjusted with the volume knob 48. In the case where the voice guide button 40 is pressed upon occurring trouble, explanation of the trouble is output by voice.

The function switch button 42 is a button for switching the mode of the multifunction machine to a duplicator, a facsimile or a printer. The one-touch operation buttons 44 are used for calling the telephone numbers having been registered therein only by pressing the buttons.

Figure 3:
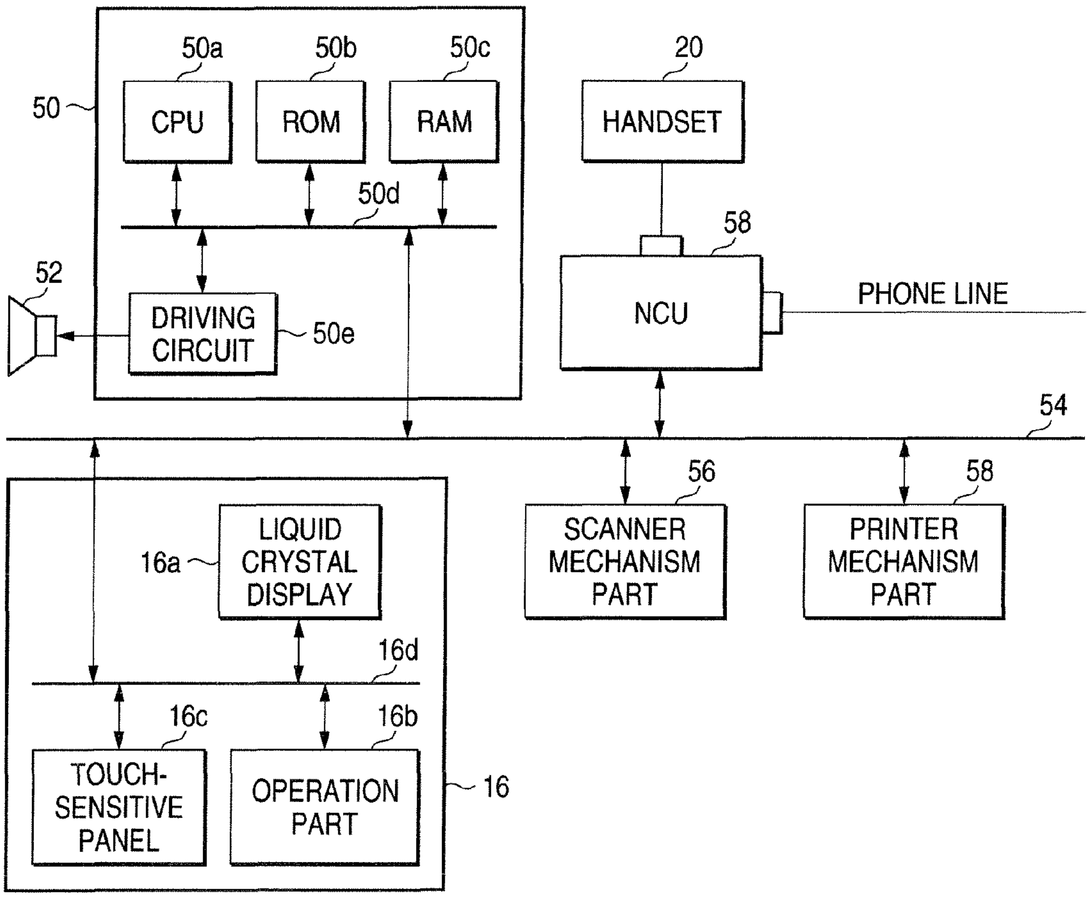
FIG. 3 is a block diagram showing a constitution of a controlling part of a multifunction machine relating to an embodiment of the invention.

The constitution of the controlling part having the control panel 16 of the multifunction machine will be described. FIG. 3 is a block diagram showing the constitution of the controlling part of the multifunction machine.

The multifunction machine has a main controller 50, and the main controller 50 is constituted with a microcomputer having a CPU 50*a*, a ROM 50*b* and a RAM 50*c* connected to a bus 50*d*. The ROM 50*b* contains voice guide data, and data and programs for displaying on the liquid crystal display 16*a*. A driving circuit 50*e* for driving a speaker 52 for voice output of the voice guide and error messages is connected to the bus 50*d* of the main controller 50. The voice from the speaker 52 is output to the exterior through the voice output part 46 of the control panel 16 shown in FIG. 2.

The control panel 16, a scanner mechanism part 56, a printer mechanism part 58 and an NCU (network control unit) 58 are connected to the main controller 50 through a system bus 54. The control panel 16 receives image data for displaying operation guide from the main controller 50 and displays the image data on the liquid crystal display 16*a*, and also it receives input from the buttons on the operation part 16*b*, such as the voice guide button 40, and sends the input information to the main controller 50.

The scanner mechanism part 56 receives a reading operation instruction from the main controller 50 to carryout the reading operation of an original copy and sends the image data thus read to the main controller 50 through the system bus 54.

The printer mechanism part 58 prints printing data sent from the main controller 50. The main controller 50 receives signals from sensors provided in the scanner mechanism part 56 and the printer mechanism part 58 to always monitor the operating state of the scanner mechanism part 56 and the printer mechanism part 58.

In the case where the multifunction machine is used as a facsimile machine, the NCU 58 connects a phone line to the main controller 50, and upon offhooking the handset 20, the NCU 58 connects the phone line to the handset 20. The NCU 58 is connected to a network line, which is not shown in the figure, and the NCU 58 receives data sent from a personal computer connected to the network line and sends the data to the main controller 50.

In the control panel 16, the liquid crystal display 16*a*, a touch-sensitive panel 16*c* provided corresponding to the display of the liquid crystal display 16*a*, and an operation part 16*b* are connected to a system bus 16*d*, whereby display on the liquid crystal display 16*a* is attained through control by the main controller 50, and operations input on the touch-sensitive panel 16*c* and the operation part 16*b* are sent to the main controller 50.

Figure 4:
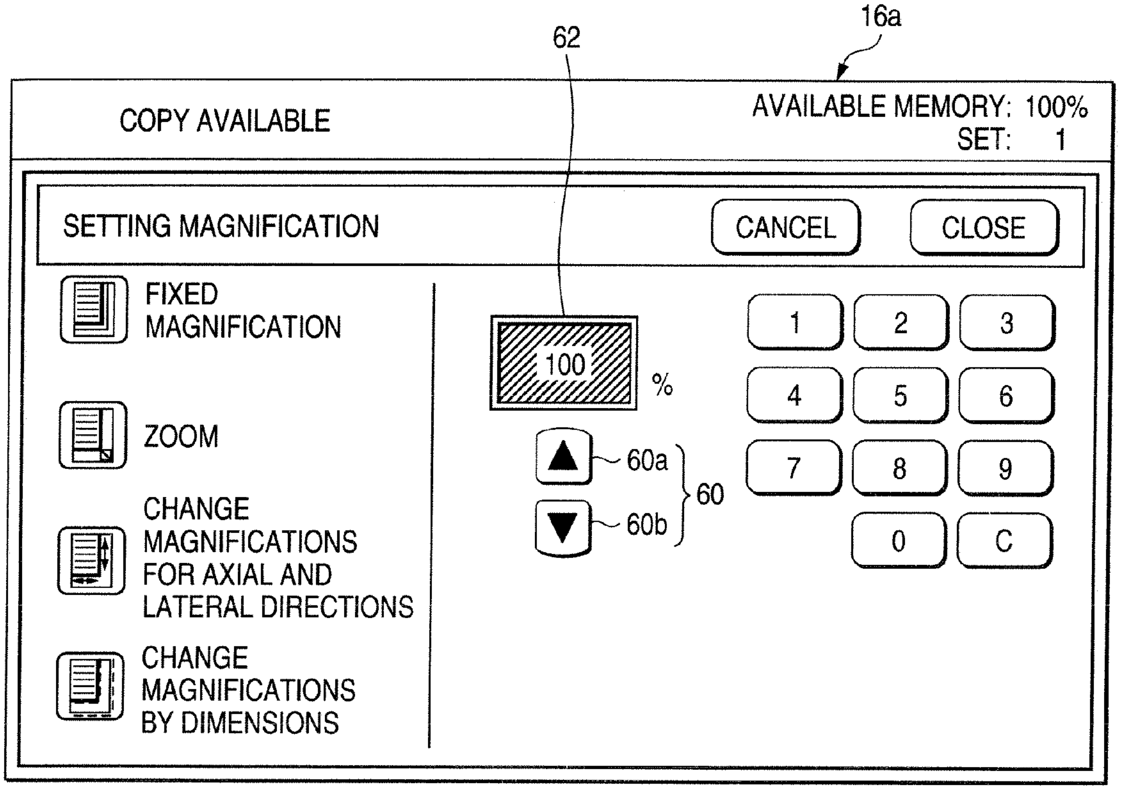
FIG. 4 is a diagram showing a screen for configuring a magnification as an example of a display screen displayed on a liquid crystal display.

An example of a display screen displayed on the liquid crystal display 16*a* will be then described. FIG. 4 shows an example of a magnification configuring screen for configuring a magnification upon duplication, printing or scanning. In FIG. 4, a magnification configuring screen upon duplication is shown.

The configuration of a magnification is carried out by operating numeric change buttons 60 displayed on the magnification configuring screen. The operation of an upper button 60*a* or a lower button 60*b* of the numeric change buttons 60 shown in FIG. 4 is detected by the touch-sensitive panel 16*c*, and thus a configured value 62 of a magnification is increased or decreased, respectively, to configure the magnification. Upon continuously operating the numeric change buttons 60 (i.e., continuously pressing the upper button 60*a* or the lower button 60*b*), the configured value 62 of the magnification is continuously changed. In the multifunction machine of this embodiment, at this time, the changing rate of the configured value 62 of the magnification thus continuously changed can be configured.

In the multifunction machine of this embodiment, the changing rate of the configured value of the magnification upon continuously pressing the numeric change buttons 60 is configured corresponding to the operation of the voice guide button 40. More specifically, in the case where the voice guide button 40 is operated, a slower rate is configured to the changing rate of the configured value of the magnification in comparison to the case where the voice guide button 40 is not operated. The changing rates of the respective cases have been stored in the RAM 50*c* of the main controller 50.

The numeric change buttons 60 displayed on the liquid crystal display 16*a* and the touch-sensitive panel 15*c* correspond to the increasing and decreasing unit of the invention, the liquid crystal display 16*a* corresponds to the numeric value displaying unit of the invention, the CPU 50*a* of the main controller 50 corresponds to the numeric value display changing unit of the invention, and the voice guide button 40 corresponds to the changing unit and the selecting unit of the invention.

A displaying process for displaying a configuring screen for the magnification in the multifunction machine thus constituted as in the foregoing will be described with reference to the flow chart shown in FIG. 5.

In step 100, the buttons are initialized. That is, in order to display the numeric change buttons 60 on the screen for configuring the magnification, the events, the display positions and the like relating to the numeric change buttons 60 are initialized.

In step 102, images for displaying the numeric change buttons 60 having been stored in the ROM 50*b* of the main controller 50 are acquired.

In step 104, attributes relating to the numeric change buttons 60 having been stored in the ROM 50*b* of the main controller 50 are acquired.

In step 106, subsequently, the mode state stored in the RAM 50*c* is acquired. The operation state of the mode state has been stored in the RAM 50*c* upon operating the voice guide button 40, and the operation state is acquired.

In step 108, it is decided as to whether or not the mode state thus acquired is in the voice guide mode. That is, it is decided as to whether or not the voice guide button 40 is operated to instruct the voice guide. In the case where the decision is denied, step 110 is executed to acquire the interval of numeric change for the normal mode, which is different from the voice guide mode, and then step 112 is executed.

In the case where the decision in the step 108 is affirmed, i.e., in the state where the voice guide mode is instructed, step 114 is executed to acquire the interval of numeric change for the voice guide mode, and then the step 112 is executed.

The interval of numeric change for the normal mode and the interval of numeric change for the voice guide mode have been stored in the ROM 50*b*, and the stored values are configured in such a manner that the interval of numeric change for the normal mode is smaller than the interval of numeric change for the voice guide mode, i.e., the changing rate of the configured value of the magnification for the normal mode is larger than that for the voice guide mode. According to the constitution, in the case where the numeric change buttons 60 are continuously pressed for configuring the magnification in the voice guide mode, the configured value of the magnification is continuously changed at a lower rate than that in the normal mode, and therefore, the operation can be easily carried out by aged persons and handicapped persons.

In the step 112, a callback function having been stored in the ROM 50*b* of the main controller 50 is acquired. That is, instructions and the like carried out upon operating the numeric change buttons 60 are acquired.

In step 116, the numeric change buttons 60 are drawn based on the information acquired in the preceding steps to complete the series of the displaying process.

A process on an operation of changing the configured value of the magnification will be described with reference to the flow chart shown in FIG. 6.

In step 200, it is decided as to whether or not the upper button 60*a* is operated. The decision is made by deciding with the CPU 50*a* of the main controller 50 as to whether or not the position on the touch-sensitive panel 16*c* corresponding to the upper button 60*a* displayed on the liquid crystal panel 16*a* is pressed. In the case where the decision is affirmed, step 202 is then executed to decide as to whether or not the predetermined period of time has lapsed. That is, the CPU 50*a* of the main controller 50 decides as to whether or not the upper button 60*a* has been continuously pressed for the predetermined period of time, and in the case where the decision is affirmed, step 204 is then executed.

In the step 204, it is decided as to whether or not the voice guide mode is active. The decision is made by deciding with the CPU 50*a* of the main controller 50 as to whether or not the voice guide button 40 has been pressed to instruct the voice guide mode, and in the case where the decision is affirmed, step 206 is executed to change the set value of the magnification with the interval of numeric change for the voice guide mode, and then step 212 is executed. In the case where the decision in the step 204 is denied, the step 208 is executed to change the set value of the magnification with the interval of numeric change for the normal mode, and then step 212 is executed. The change of the set value of the magnification is terminated upon completing the continuous operation of the upper button 60*a*.

In the case where the decision in the step 202 is denied, step 210 is executed to increase the set value of the magnification by 1, and then the step 212 is executed.

In the case where the decision in the step 200 is denied, the step 212 is then immediately executed.

In the step 212, a process relating to the lower button 60*b* is carried out in the similar manner as in the steps 200 to 210. That is, in the step 212, it is decided as to whether or not the lower button 60*b* is operated. The decision is made by deciding with the CPU 50*a* of the main controller 50 as to whether or not the position on the touch-sensitive panel 16*c* corresponding to the lower button 60*b* displayed on the liquid crystal panel 16*a* is pressed. In the case where the decision is affirmed, step 214 is then executed to decide as to whether or not the predetermined period of time has lapsed. That is, the CPU 50*a* of the main controller 50 decides as to whether or not the lower button 60*b* has been continuously pressed for the predetermined period of time, and in the case where the decision is affirmed, step 216 is then executed.

In the step 216, it is decided as to whether or not the voice guide mode is active. The decision is made by deciding with the CPU 50*a* of the main controller 50 as to whether or not the voice guide button 40 has been pressed to instruct the voice guide mode, and in the case where the decision is affirmed, step 218 is executed to change the set value of the magnification with the interval of numeric change for the voice guide mode, and then step 224 is executed. In the case where the decision in the step 216 is denied, the step 220 is executed to change the set value of the magnification with the interval of numeric change for the normal mode, and then step 224 is executed. The change of the set value of the magnification is terminated upon completing the continuous operation of the lower button 60*b*.

In the case where the decision in the step 214 is denied, step 222 is executed to decrease the set value of the magnification by 1, and then the step 224 is executed.

In the step 224, it is decided as to whether or not the setting is completed. The decision is made with the CPU 50*a* of the main controller 50 as to whether or not the operation for completing the setting is made on the control panel 16, and in the case where the decision is denied, the step 200 is again executed, and the aforementioned process is repeated until the decision in the step 224 is affirmed.

As described in the foregoing, in the multifunction machine according to this embodiment of the invention, upon configuring the magnification, the set value of the magnification is changed with the intervals of numeric change, which are different from each other between the voice guide mode activated with the voice guide button 40 and the normal mode, in which the interval of numeric change for the normal mode is smaller than the interval of numeric change for the voice guide mode, i.e., the changing rate of the set value of the magnification for the normal mode is larger than that for the voice guide mode. Consequently, the operation can be easily carried out by aged persons and handicapped persons by using the voice guide mode.

Figure 7A:
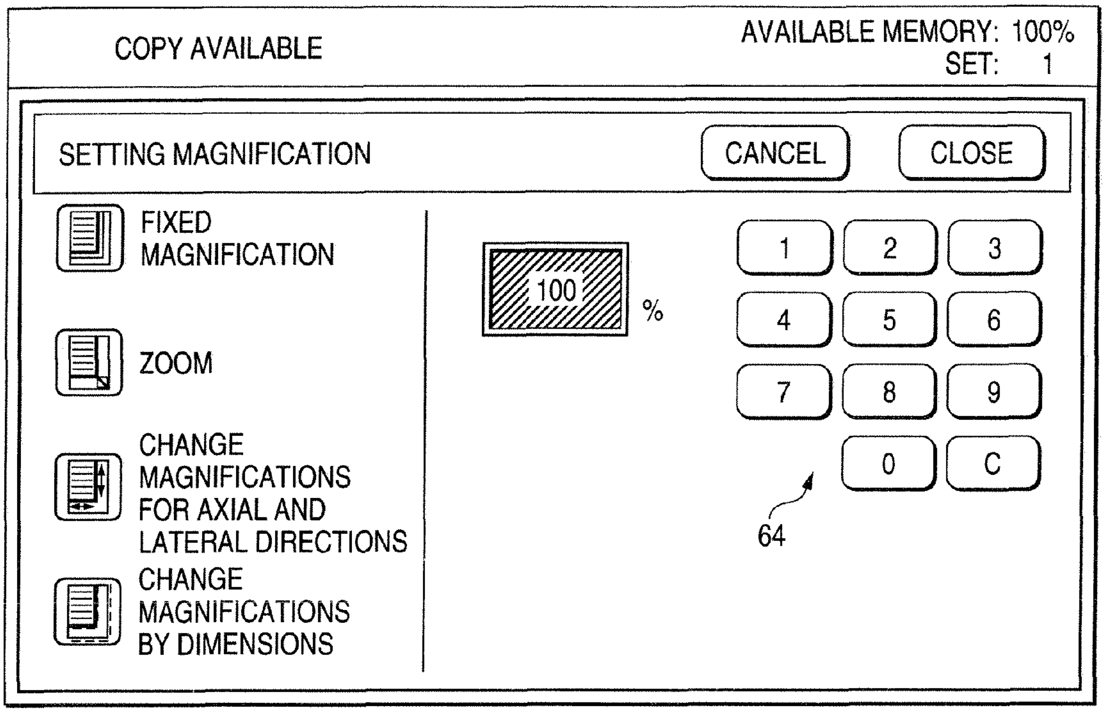
FIGS. 7A and 7B are diagrams showing examples of a screen for configuring a magnification upon prohibiting an operation of a numeric change button.
Figure 7B:
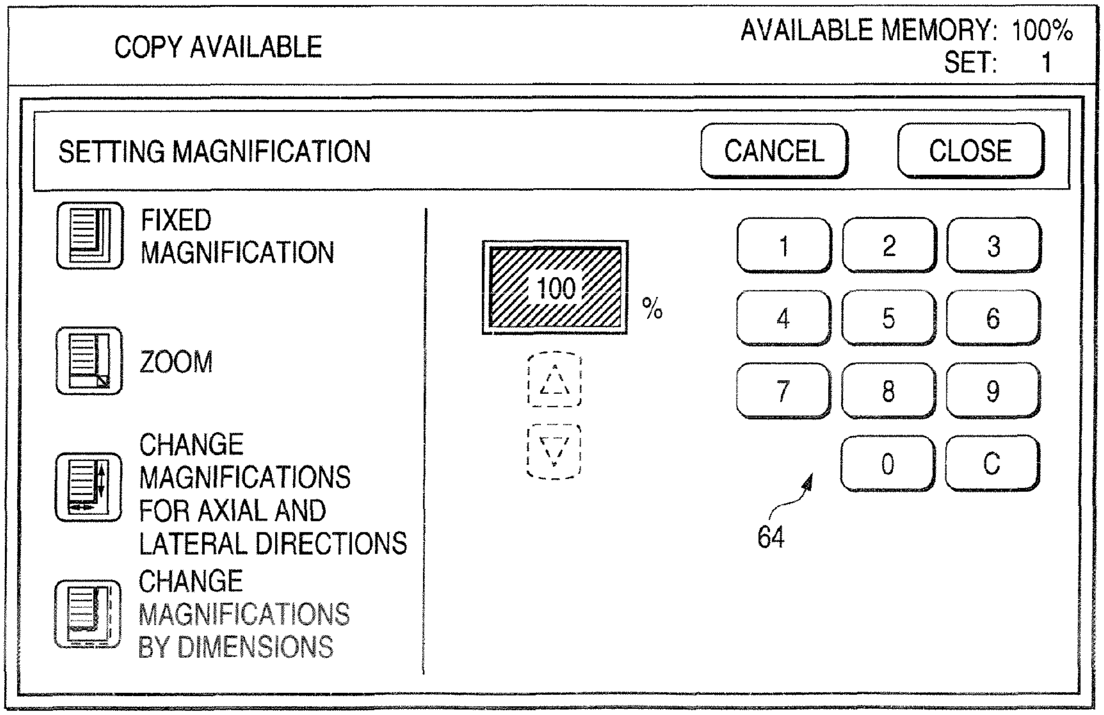

A first modified embodiment of the multifunction machine according to the aforementioned embodiment will be then described. The intervals of numeric change upon changing the set value of the magnification for the voice guide mode and the normal mode are differentiated from each other in the aforementioned embodiment. In the first modified embodiment, the numeric change buttons 60 are not displayed or are displayed as nonusable in the voice guide mode as shown in FIGS. 7A and 7B, and the magnification is configured only with a numeric keypad 64 thus displayed. The constitution of the apparatus in the first modified embodiment is the same as in the aforementioned embodiment, and thus the explanation thereof is omitted herein.

Figure 5:
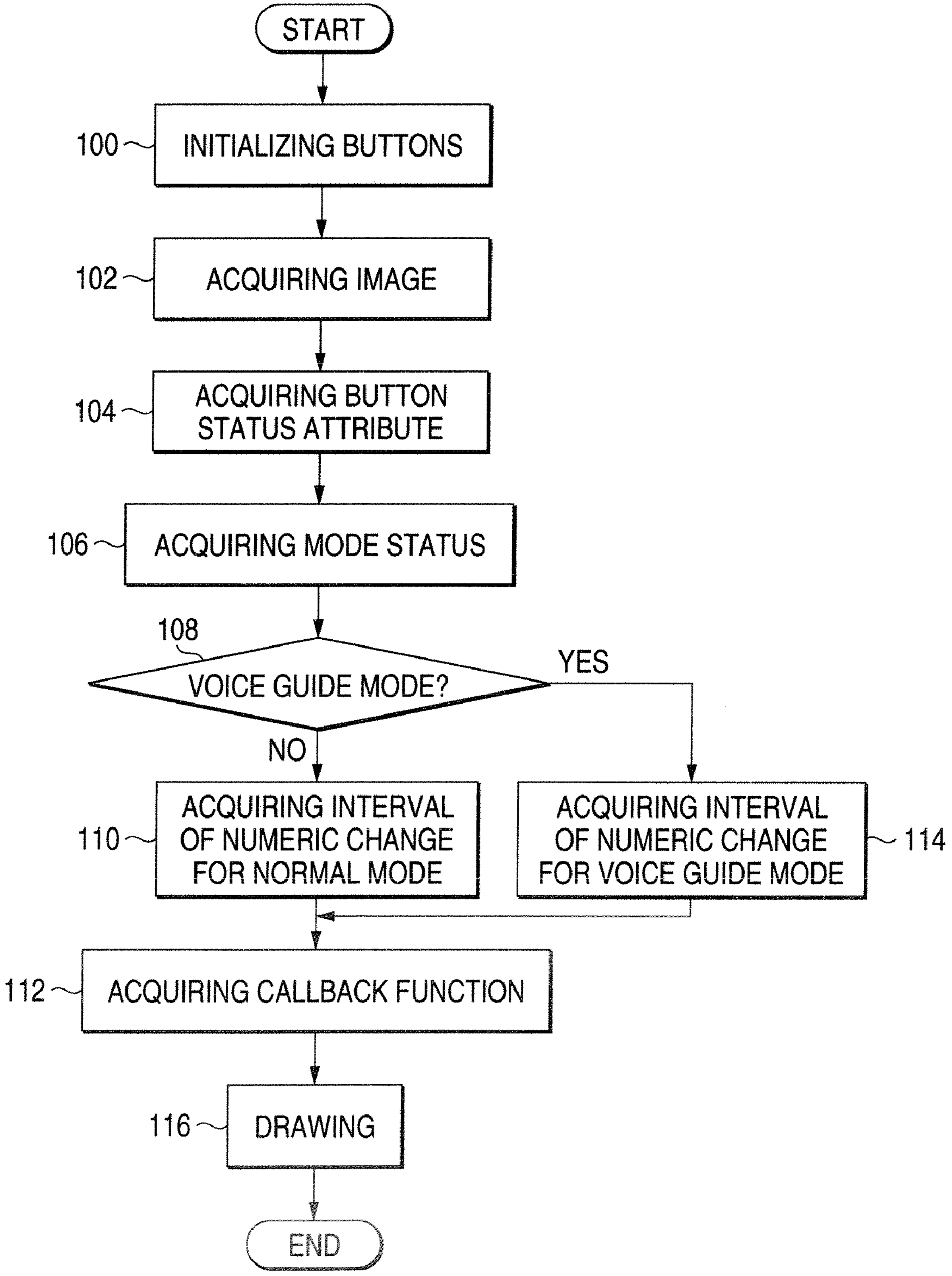
FIG. 5 is a flow chart showing a process for displaying a screen for configuring a magnification.

In the displaying process in the first modified embodiment, for example, infinity is acquired as the interval of numeric change, i.e., a value indicating no change is acquired, upon acquiring the interval of numeric change for the voice guide mode in the step 114 in the flow chart shown in FIG. 5. The other matters of the displaying process are the same as in the aforementioned embodiment, and thus the explanation thereof is omitted herein.

Figure 6:
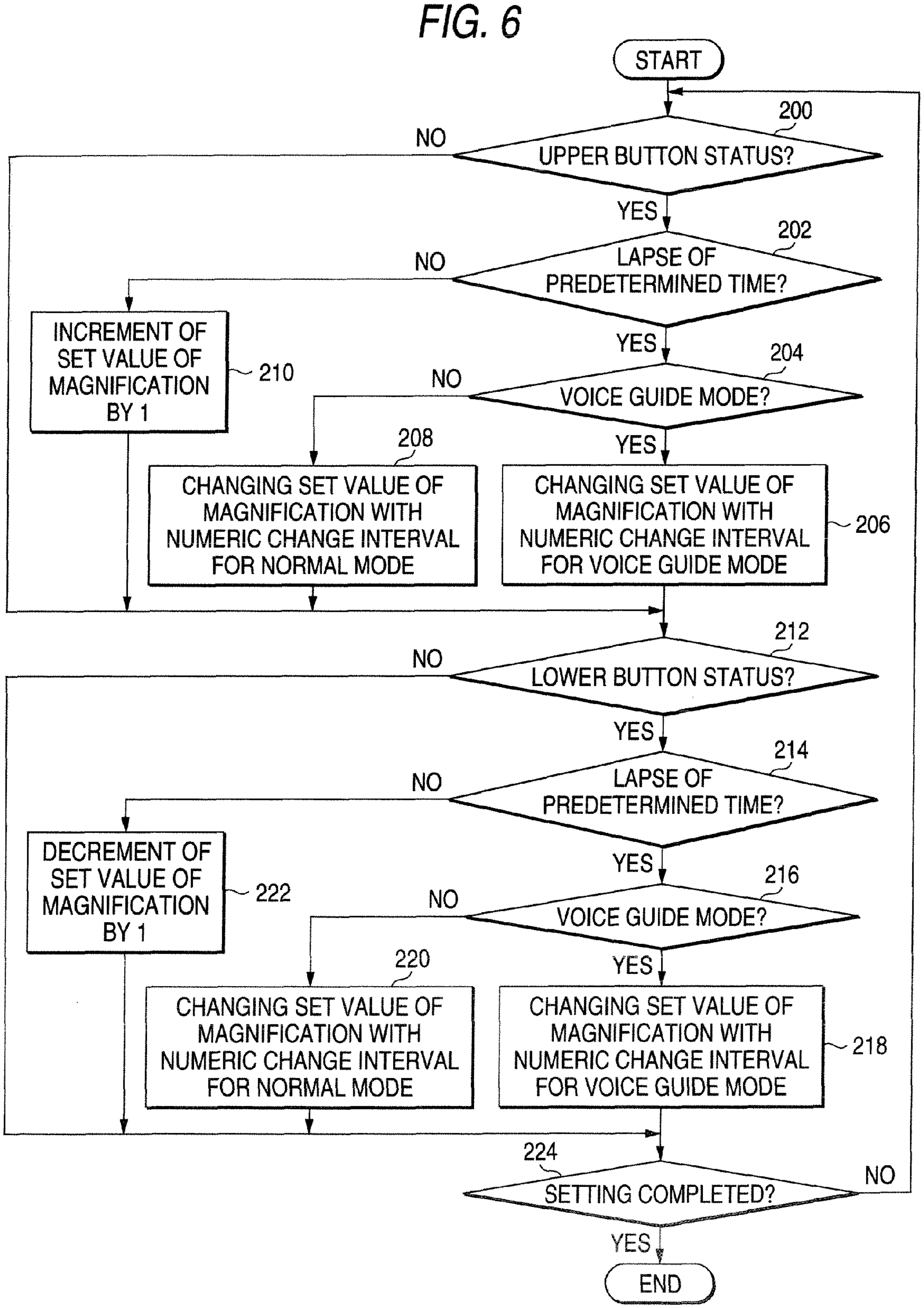
FIG. 6 is a flowchart showing a process on an operation of changing a configured value of a magnification.
Figure 8:
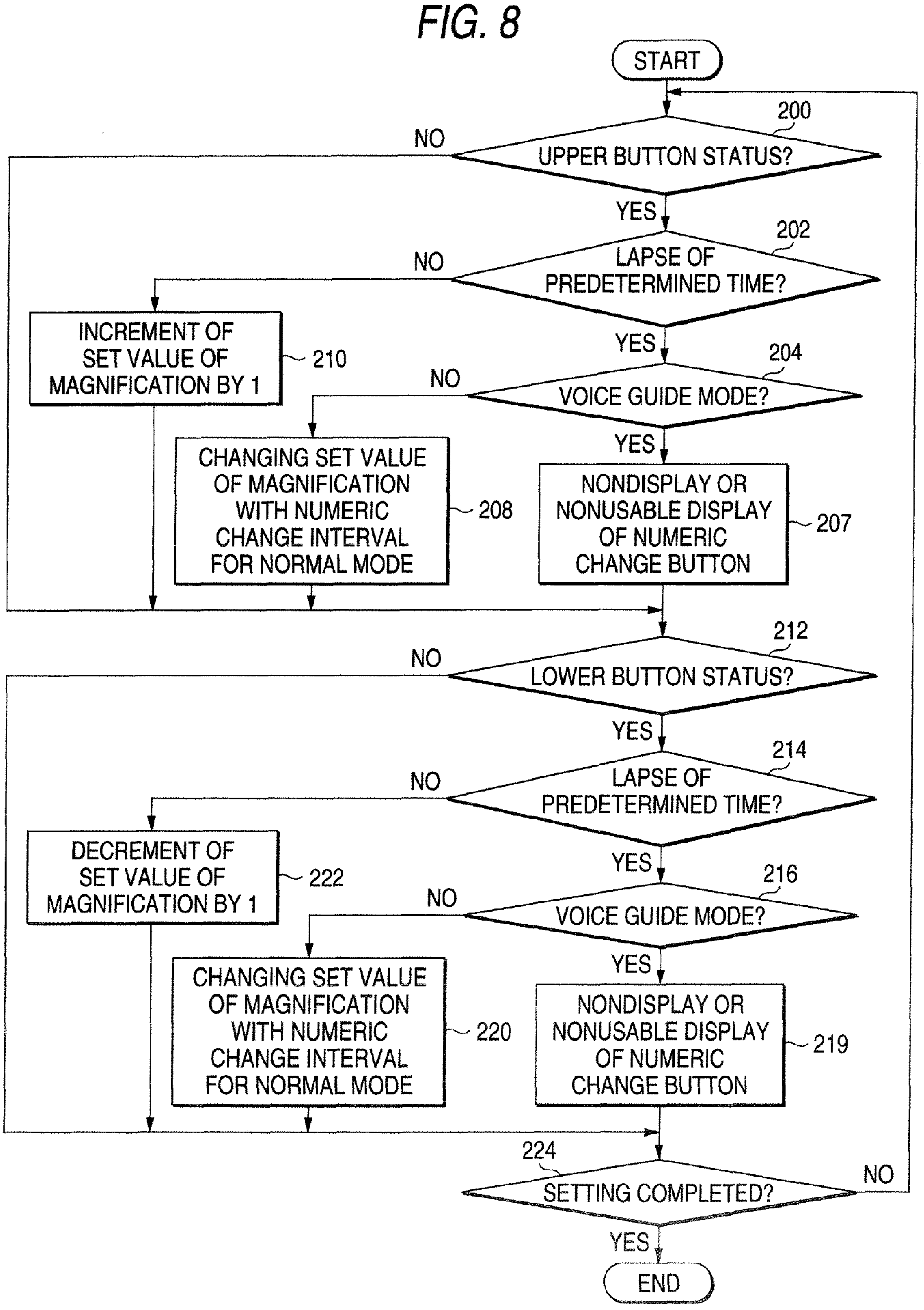
FIG. 8 is a flowchart showing a process on an operation of changing a configured value of a magnification upon prohibiting an operation of a numeric change button.

In the process of an operation of changing the set value of the magnification in the first modified embodiment, the steps 206 and 218 in the flow chart shown in FIG. 6 are replaced with steps 207 and 219 in the flow chart shown in FIG. 8, in which the numeric change button is not displayed or is displayed as nonusable. That is, the numeric change buttons 60 are displayed in the manner shown in FIG. 7A or 7B to prohibit the operation of the numeric change buttons 60, and the configuration can be made only with the numeric keypad 64 thus displayed. According to the constitution, the configuration of the magnification can be certainly carried out by aged persons and handicapped persons.

The steps 207 and 219 correspond to the prohibiting unit of the invention, the displayed numeric keypad 64 and the touch-sensitive panel 16*c* correspond to the inputting unit of the invention, and the numeric change buttons 60 correspond to the operation part displaying unit of the invention.

A second modified embodiment of the multifunction machine according to the aforementioned embodiment will be then described. The changing rates of the numeric value upon configuring the magnification for the voice guide mode and the normal mode are differentiated from each other in the aforementioned embodiment. In the second modified embodiment, it is configured by providing a configuration screen therefor. The constitution of the apparatus in the second modified embodiment is the same as in the aforementioned embodiment, and thus the explanation thereof is omitted herein.

Figure 9:
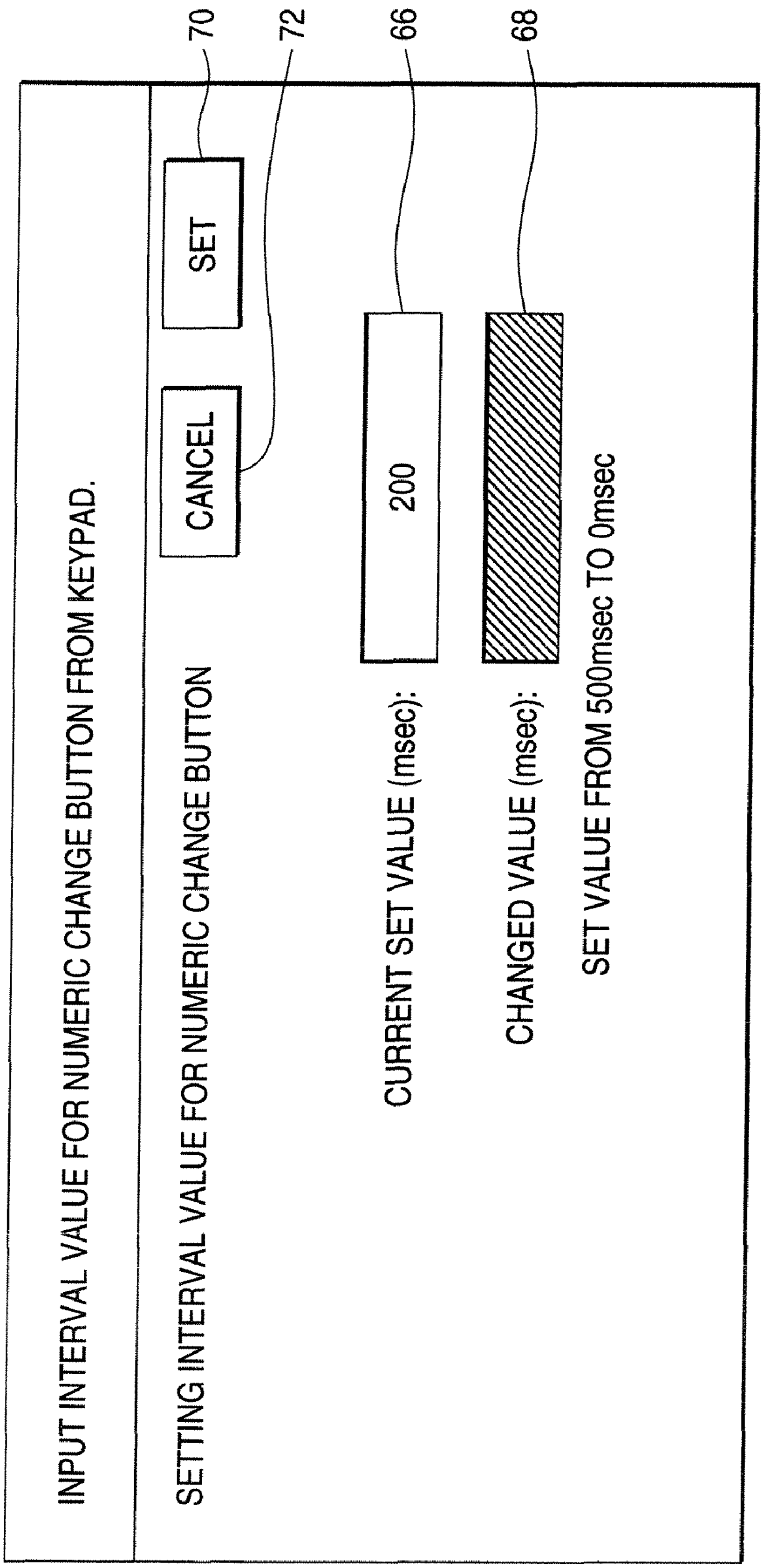
FIG. 9 is a diagram showing an example of a screen for changing a numeric change rate (a numeric change button interval) upon configuring a magnification.

The changing rate of the value in the second modified embodiment is set by configuring the interval for the numeric change buttons, and the configuration can be carried out by operating the numeric keypad 26. That is, as shown in the configuration screen in FIG. 9, a changed value 68 is input by operating the numeric keypad 26 with reference to the current set value 66, and then a set button 70 displayed on the liquid crystal display 16*a* is pressed to set the changed value 68, whereby the set value stored in the RAM 50*c* of the main controller 50 is renewed. It is also possible that a nonvolatile memory is equipped in the main controller 50, and the set value is stored in the nonvolatile memory. The changed value 68 can be cancelled by pressing a cancel button 72.

Figure 10:
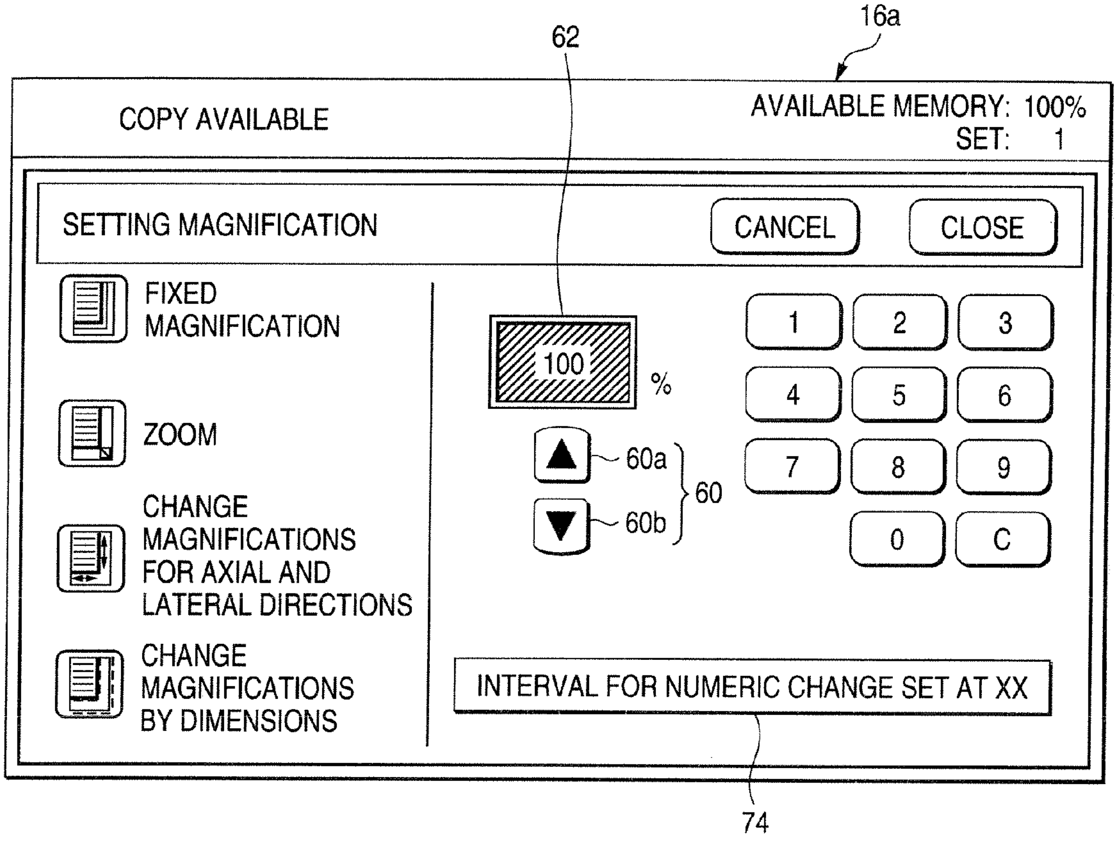
FIG. 10 is a diagram showing an example of a case where a numeric change rate upon configuring a magnification is displayed on a screen for configuring the magnification.

FIG. 10 shows an example of the screen for configuring the magnification in the second embodiment. In the second modified embodiment, the value of the interval of numeric change 74 thus set in the aforementioned configuration screen is displayed on the screen for configuring the magnification. FIG. 10 shows an example, in which the display of the value of the interval of numeric change 74 is made with language "INTERVAL FOR NUMERIC CHANGE SET AT XX".

Figure 11:
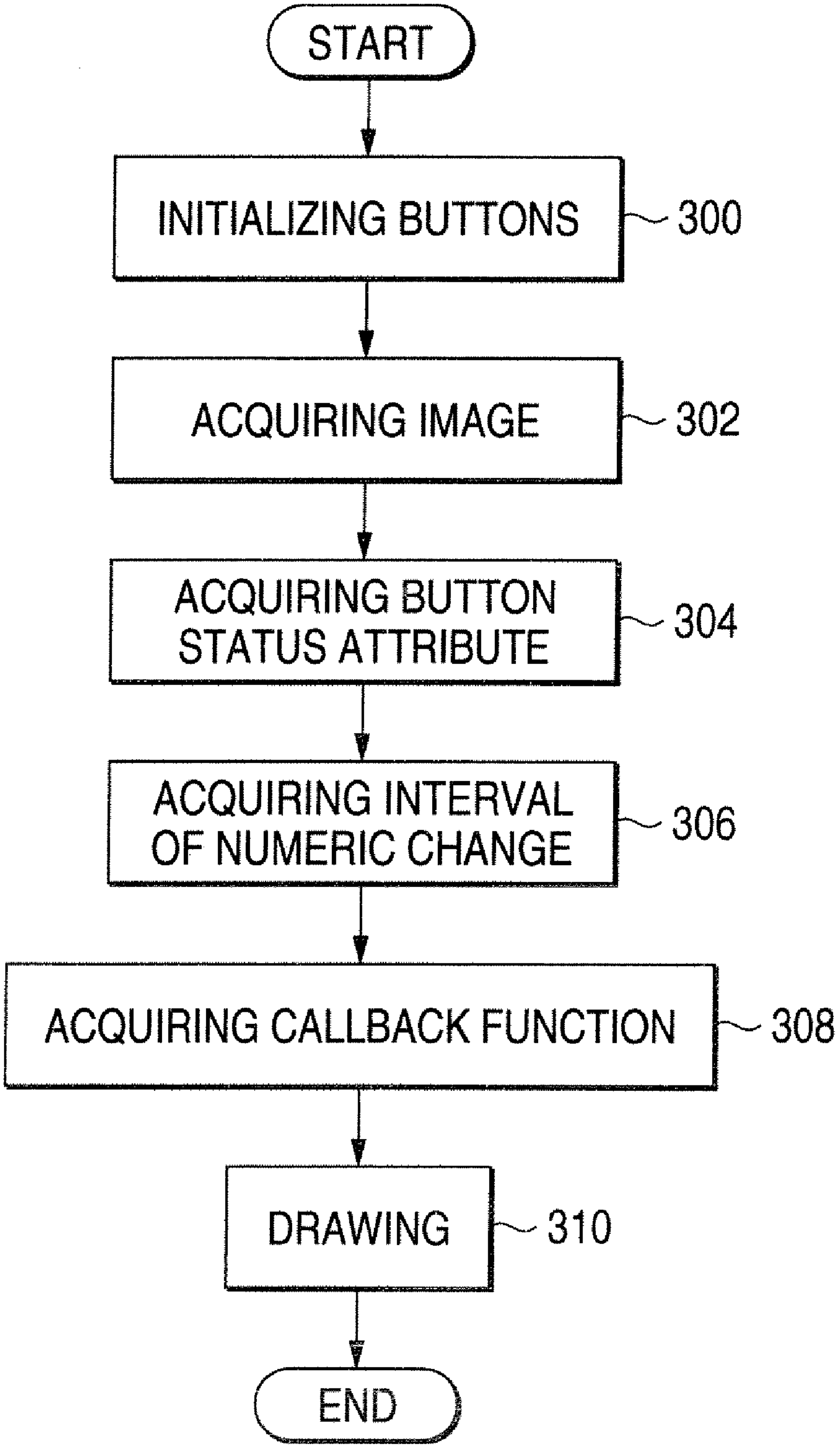
FIG. 11 is a flow chart showing a process for displaying a screen for configuring a magnification in the case where a numeric change rate upon configuring a magnification is changed.

The displaying process in the second modified embodiment is carried out in the manner in the flow chart shown in FIG. 11.

In step 300, the buttons are initialized. That is, in order to display the numeric change buttons 60 on the screen for configuring the magnification, the events, the display positions and the like relating to the numeric change buttons 60 are initialized.

In step 302, images for displaying the numeric change buttons 60 having been stored in the ROM 50*b* of the main controller 50 are acquired.

In step 304, attributes relating to the numeric change buttons 60 having been stored in the ROM 50*b* of the main controller 50 are acquired.

In step 306, the interval of numeric change having been set in the configuration screen is acquired, and then step 308 is executed.

In the step 308, a callback function having been stored in the ROM 50*b* of the main controller 50 is acquired. That is, instructions and the like carried out upon operating the numeric change buttons 60 are acquired.

In step 310, the numeric change buttons 60 are drawn based on the information acquired in the preceding steps to complete the series of the displaying process. At this time, the value of the interval of numeric change 74 thus acquired in the step 306 is displayed as shown in FIG. 10, whereby the current value of the interval for the numeric change buttons can be recognized.

Figure 12:
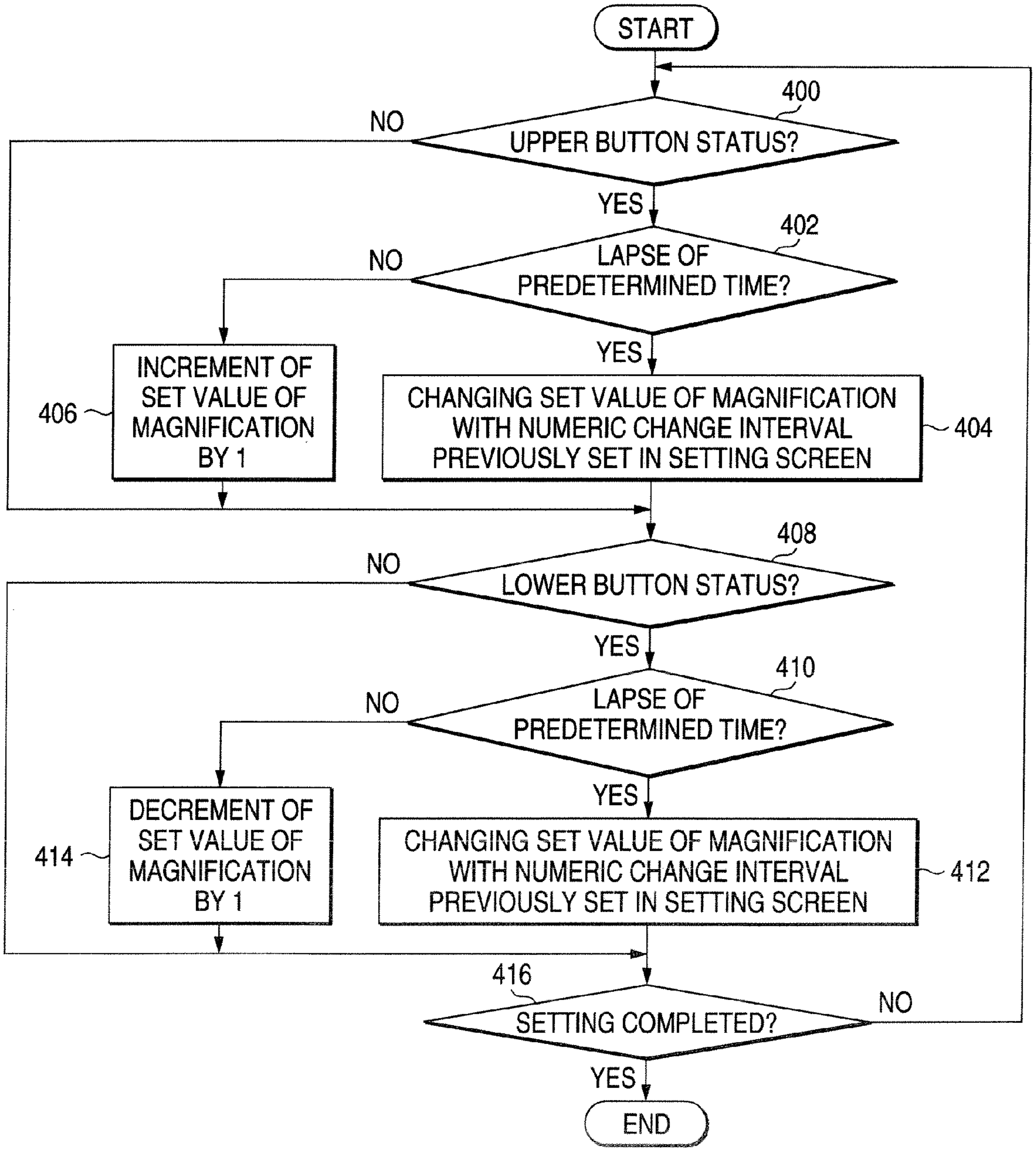
FIG. 12 is a flow chart showing a process on an operation of changing a configured value of a magnification in the case where a numeric change rate upon configuring a magnification is changed.

A process on an operation of changing the configured value of the magnification in the second modified embodiment is carried out in the manner shown by the flow chart shown in FIG. 12.

That is, in step 400, it is decided as to whether or not the upper button 60*a* is operated. The decision is made by deciding with the CPU 50*a* of the main controller 50 as to whether or not the position on the touch-sensitive panel 16*c* corresponding to the upper button 60*a* displayed on the liquid crystal panel 16*a* is pressed. In the case where the decision is affirmed, step 402 is then executed to decide as to whether or not the predetermined period of time has lapsed. That is, the CPU 50*a* of the main controller 50 decides as to whether or not the upper button 60*a* has been continuously pressed for the predetermined period of time, and in the case where the decision is affirmed, step 404 is then executed.

In the step 404, the set value of the magnification is changed with the interval of numeric change having been configured in the aforementioned configuration screen, and then step 408 is executed. The change of the set value of the magnification is terminated upon completing the continuous operation of the upper button 60*a*.

In the case where the decision in the step 402 is denied, step 406 is executed to increase the set value of the magnification by 1, and then the step 408 is executed.

In the step 408, a process relating to the lower button 60*b* is carried out in the similar manner as in the steps 400 to 406. That is, in the step 408, it is decided as to whether or not the lower button 60*b* is operated. The decision is made by deciding with the CPU 50*a* of the main controller 50 as to whether or not the position on the touch-sensitive panel 16*c* corresponding to the lower button 60*b* displayed on the liquid crystal panel 16*a* is pressed. In the case where the decision is affirmed, step 410 is then executed to decide as to whether or not the predetermined period of time has lapsed. That is, the CPU 50*a* of the main controller 50 decides as to whether or not the lower button 60*b* has been continuously pressed for the predetermined period of time, and in the case where the decision is affirmed, step 412 is then executed.

In the step 412, the set value of the magnification is changed with the interval of numeric change having been configured in the aforementioned configuration screen, and then step 416 is executed. The change of the set value of the magnification is terminated upon completing the continuous operation of the lower button 60*b*.

In the case where the decision in the step 410 is denied, step 414 is executed to increase the set value of the magnification by 1, and then the step 416 is executed.

In the step 416, it is decided as to whether or not the setting is completed. The decision is made with the CPU 50*a* of the main controller 50 as to whether or not the operation for completing the setting is made on the control panel 16, and in the case where the decision is denied, the step 400 is again executed, and the aforementioned process is repeated until the decision in the step 416 is affirmed.

As described in the foregoing, the changing rate of the value upon configuring the magnification is configured, whereby the changing rate of the value continuously changed upon continuously pressing the numeric change buttons 60 displayed on the liquid crystal display 16*a* upon configuring the magnification can be set at a desired rate. Consequently, the operation can be easily carried out by aged persons and handicapped persons by using the voice guide mode.

While the aforementioned embodiments have been described by exemplifying the set value of the magnification, the invention is not limited thereto and can be applied to any value that is to be continuously increased and decreased, and for example, the invention can be applied to such configuration as a number of copies and a number of prints.

As described in the foregoing, according to the invention, the rate upon continuously changing a value representing a prescribed configured value can be changed, and therefore, the invention exerts such an effect that the operation can be easily carried out by aged persons and handicapped persons.

The entire disclosure of Japanese Patent Application No. 2003-017632 filed on Jan. 27, 2003 including specification, claims, drawings and abstract is incorporated herein by reference in its entirety.

What is claimed is:

1. A displaying device comprising:

an increasing and decreasing unit that instructs increment or decrement of a numeric value representing a prescribed configured value;

a changing unit that changes all intervals of the increment or decrement of the numeric value instructed by the increasing and decreasing unit;

a numeric value displaying unit that displays the numeric value thus increased or decreased by the instruction made by the increasing and decreasing unit at the intervals changed by the changing unit; and a numeric value display changing unit that continuously changes the numeric value displayed on the numeric value displaying unit during a period where the instruction is continuously made by the increasing and decreasing unit.

2. The displaying device as claimed in claim 1, wherein the displaying device further comprises a display unit for displaying information relating to the rate thus changed by the changing unit.

3. The displaying device as claimed in claim 1, wherein the changing unit comprises an inputting unit for inputting the value and a prohibiting unit for prohibiting the increment or decrement of the numeric value by the increasing and decreasing unit.

4. The displaying device as claimed in claim 1, wherein the changing unit comprises a selecting unit for selecting from two or more modes with the rates different from each other, an inputting unit for inputting the value, and a prohibiting unit for prohibiting the increment or decrement of the numeric value with the increasing and decreasing unit upon selecting a prescribed mode from the two or more modes by the selecting unit.

5. The displaying device as claimed in claim 4, wherein the increasing and decreasing unit comprises an operation part displaying unit for displaying an operation part for instructing increment or decrement of the numeric value, and the prohibiting unit prohibits increment and decrement of the numeric value with the increasing and decreasing unit by non-displaying the operation part.

6. A displaying method comprising:

instructing increment or decrement of a numeric value representing a prescribed configured value;

changing all intervals of the increment or decrement of the numeral value instructed by the instructing step;

displaying the numeric value increased or decreased by the instruction made by the instructing step at the intervals changed by the changing step; and continuously changing the numeric value displayed on the displaying step during a period where the instruction is continuously made.

7. The displaying method as claimed in claim 6 comprising:

the changing step further comprising selecting from two or more modes with the rates different from each other, inputting the value, and prohibiting the increment or decrement of the numeric value upon selecting a prescribed mode from the two or more mode.

8. A displaying device comprising:

an increasing and decreasing unit that instructs increment or decrement of a numeric value from the first numeric value to a second numeric value;

a numeric value displaying unit that displays the numeric value thus increased or decreased by the instruction made by the increasing and decreasing unit;

a numeric value display changing unit that continuously changes the numeric value displayed on the numeric value displaying unit during a period where the instruction is continuously made by the increasing and decreasing unit; and a change unit that changes a period of time between when the increment or decrement of the numeric value is instructed by the increasing and decreasing unit and when the increment or decrement of the numeric value is started.

* * * * *